No. 794,740. PATENTED JULY 18, 1905.
H. H. PORTER, Jr.
WHEEL.
APPLICATION FILED MAR. 17, 1902.

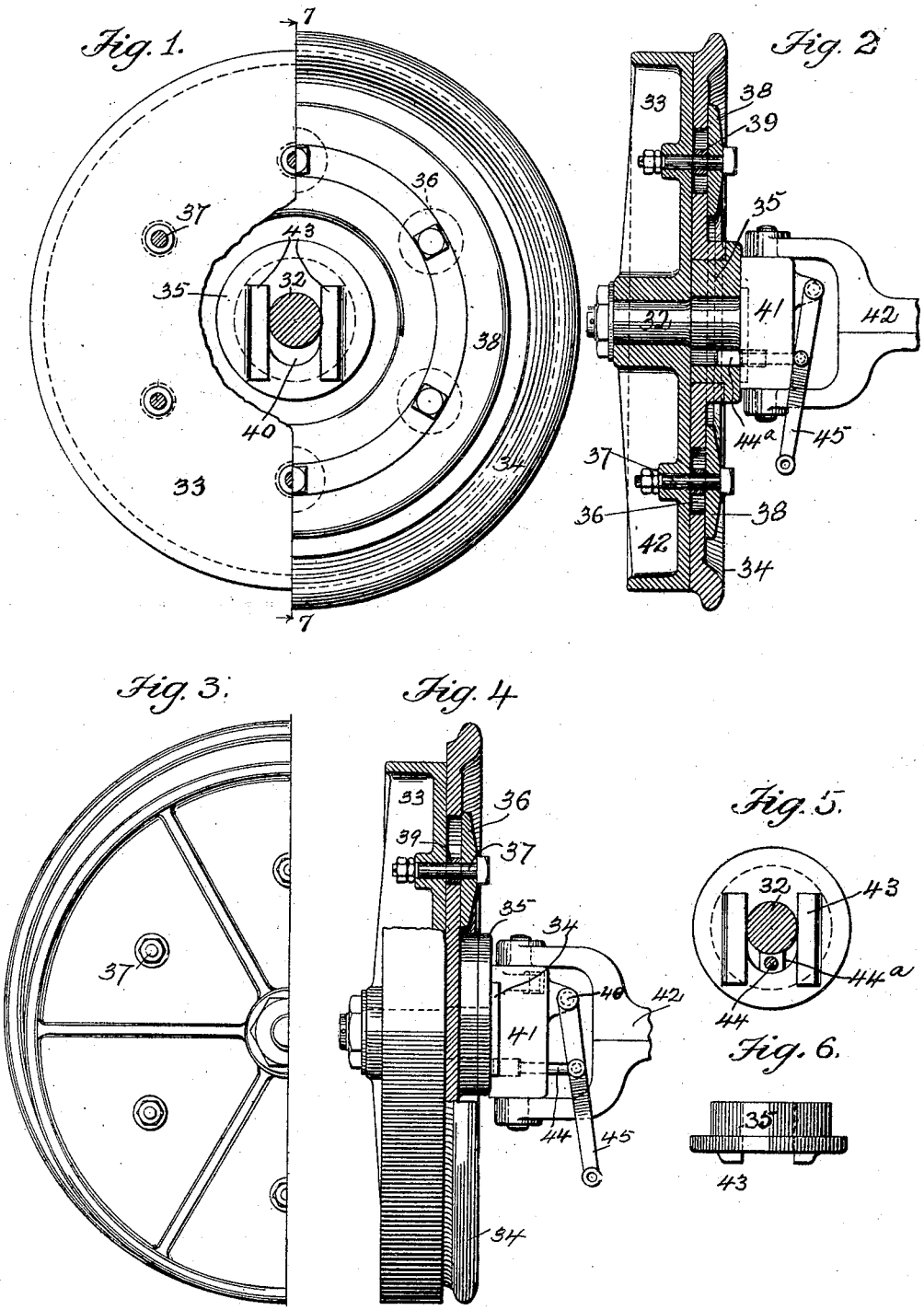

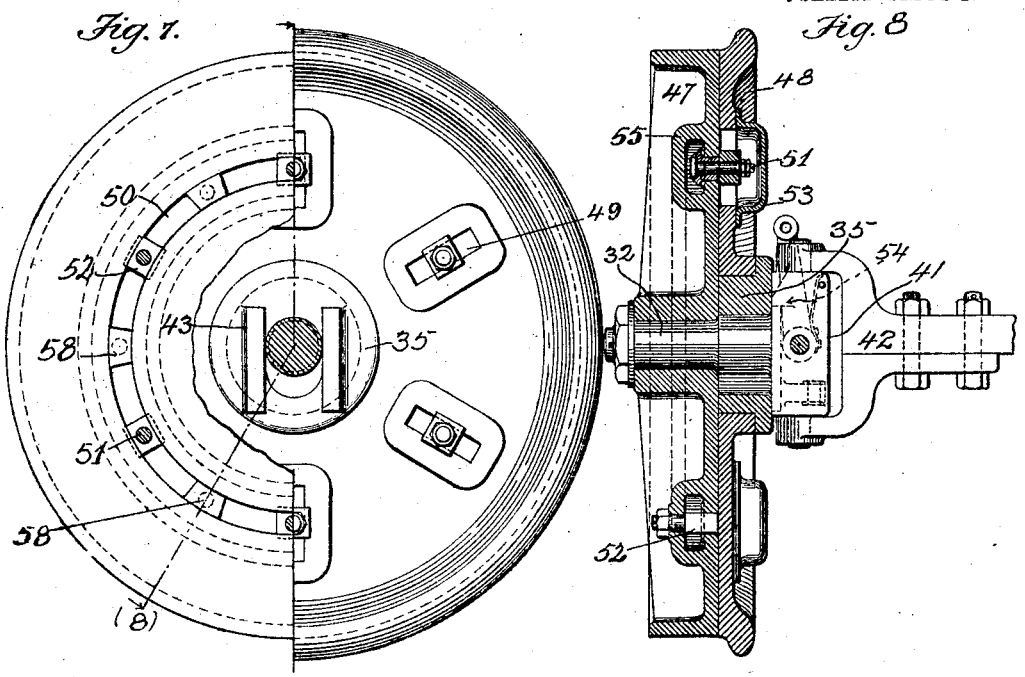
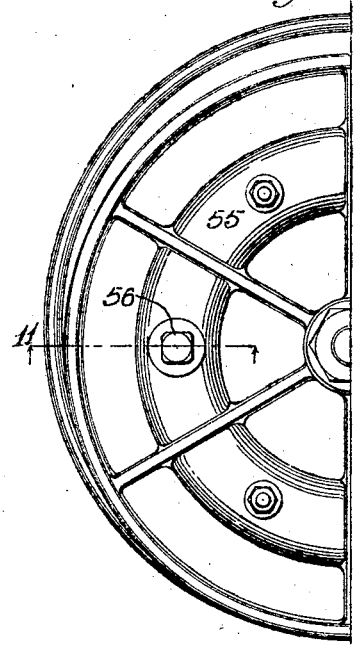
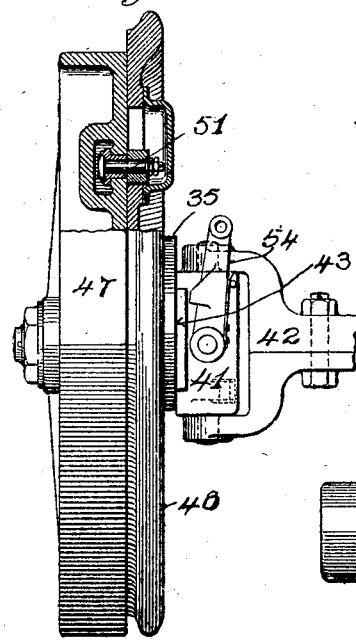
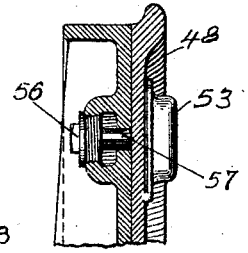
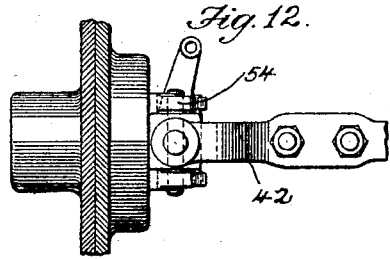

Witnesses:
Oscar A. Thelin.
Paul Carpenter

Inventor:
Henry H. Porter Jr.
by Paul Synnestvedt
Atty.

No. 794,740. PATENTED JULY 18, 1905.
H. H. PORTER, Jr.
WHEEL.
APPLICATION FILED MAR. 17, 1902.

Witnesses:
Oscar A. Thelin.
Paul Carpenter

Inventor:
Henry H. Porter Jr.
by Paul Synnestvedt
Atty.

No. 794,740. PATENTED JULY 18, 1905.
H. H. PORTER, Jr.
WHEEL.
APPLICATION FILED MAR. 17, 1902.

Witnesses:
Oscar A. Thelin
Paul Carpenter

Inventor:
Henry H. Porter Jr
by Paul Synnestvedt
Atty.

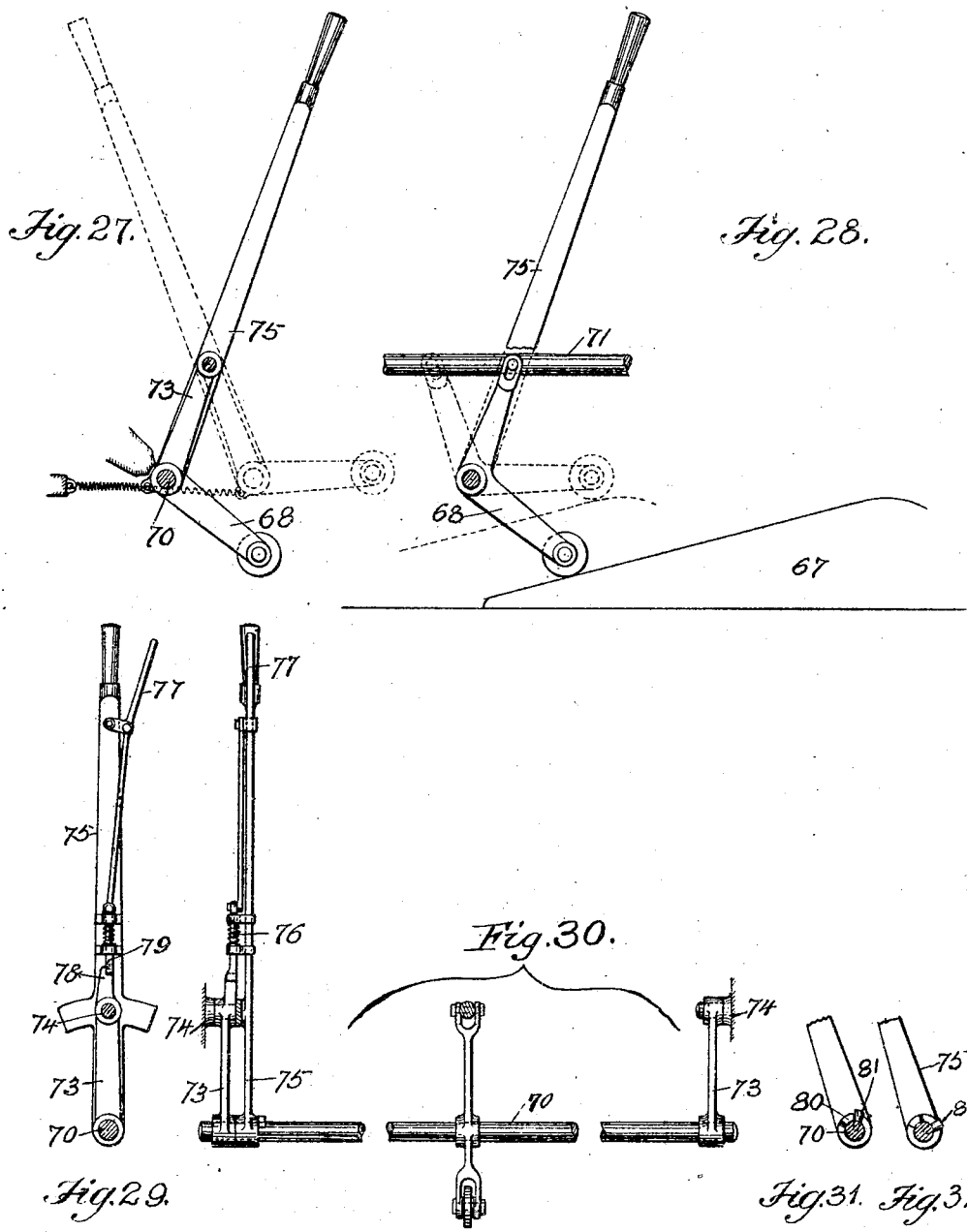

No. 794,740.

Patented July 18, 1905.

UNITED STATES PATENT OFFICE.

HENRY H. PORTER, JR., OF CHICAGO, ILLINOIS, ASSIGNOR TO SWANITZ COMPANY, OF CHICAGO, ILLINOIS, A CORPORATION OF DELAWARE.

WHEEL.

SPECIFICATION forming part of Letters Patent No. 794,740, dated July 18, 1905.

Application filed March 17, 1902. Serial No. 98,634.

*To all whom it may concern:*

Be it known that I, HENRY H. PORTER, Jr., a citizen of the United States, residing at Chicago, in the State of Illinois, have invented certain new and useful Improvements in Wheels, of which the following, taken in connection with the accompanying drawings, is a specification.

The first object of my invention is the construction of an improved form of wheel designed for use either on a rail or on a plane surface or roadbed, as required, and a construction whereby the change in the wheel from the one to the other is made automatically, the parts being locked in the proper position when the apparatus is in shape for use on a rail, and the provision of certain other features whereby it is possible to make the change from the rail wheel to the floor or plain wheel, also automatic, if desired. Another object is the provision of a wheel in which the flange shall be formed on a disk, which in operative position is concentric with the wheel, forming a flanged wheel similar to those in common use for railway transportation.

Further objects are, the provision of means for holding the wheel and the flange-disk together for simultaneous rotation, or alternately to allow relative movement, as may be preferred; and to provide a sleeve bearing which, in the preferred construction of my improvement, is non-rotatable but capable of vertical shifting, carrying with it the flange-disk, when it is desired to cause the latter to be moved into or out of operative position.

The above, as well as such other objects as may hereinafter appear, I attain by means of the construction illustrated in preferred forms in the accompanying drawings, in which—

Figure 1 is an inside elevation, and Figure 2 is a vertical transverse section through the center, of a wheel mounted upon a pivoted arbor and containing one form of my improvement; the flange being in operative position;

Figure 3 is half of an outside elevation of the same wheel with the flange in raised or in-operative position;

Figure 4 is a partial side elevation and partial section of the same, with the locking pin for holding the flange bearing withdrawn;

Figures 5 and 6 are respectively a side elevation and a plan of the sleeve forming the bearing of the flange;

Figure 7 is an inside elevation with parts of the flange broken away, showing a modification of my improvement, the flange being in operative position;

Figure 8 is a central transverse section of the wheel of Figure 7 taken along the line (8) in said figure, and also showing a modified form of devices for holding the flange in operative position;

Figure 9 is half of an outside elevation of the wheel of Figure 7, with the flange drawn up out of operative position;

Figure 10 is a side elevation of the axle and wheel showing the wheel partially in section along the line (8) in Figure 7;

Figure 11 is a partial section taken on line (11) in Figure 9 showing the plug for removing the bolts for attachment of the flange to the wheel;

Figure 12 is a plan view of the pivoted arbor on the axle and a fragmentary portion of the wheel;

Figures 27 and 28 show a detail connected with the mechanism shown in Figures 24 to 26 inclusive, showing hand-actuated devices for throwing the automatic tripping mechanism out of use;

Figures 29 and 30 show elevations of the lever mechanism, and

Figures 31 and 32 show in detail the method of mounting the lever about the shaft.

Figure 13:
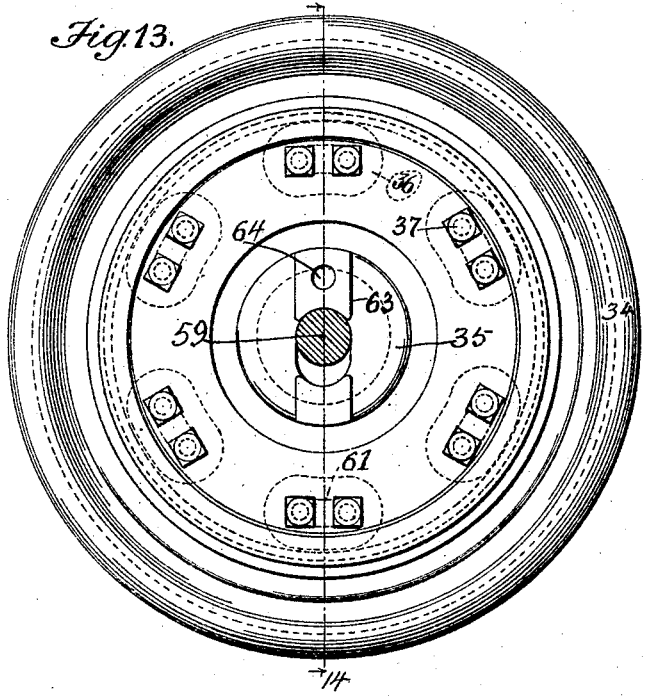
Figures 13 and 14 are respectively, an inside elevation, and a vertical transverse section, through a modified form of my wheel in which there is provided a gearing on the wheel.
Figure 14:
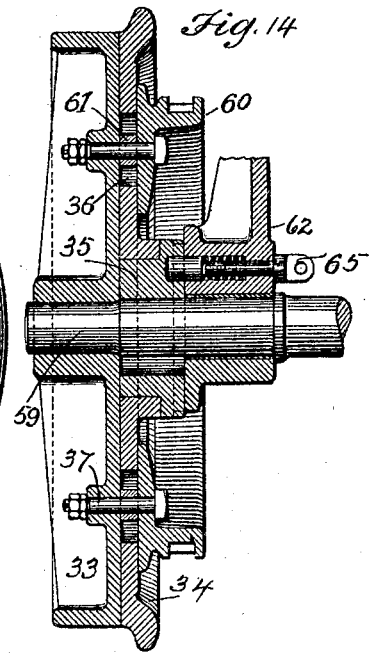
Figure 15:
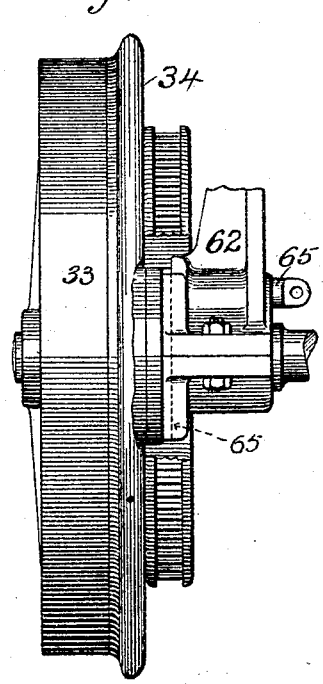
Figures 15 and 16 are respectively, an edge view in elevation, and a transverse vertical section, of the same wheel as in Figure 13 with the flange drawn upward out of operative position.
Figure 16:
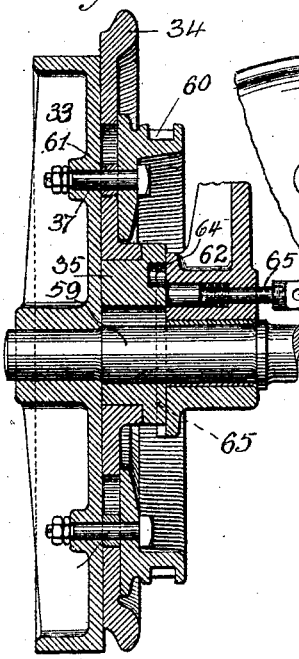
Figure 17:
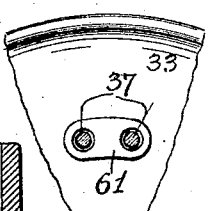
Figure 17 shows a detail of the mechanism of Figure 16.
Figure 18:
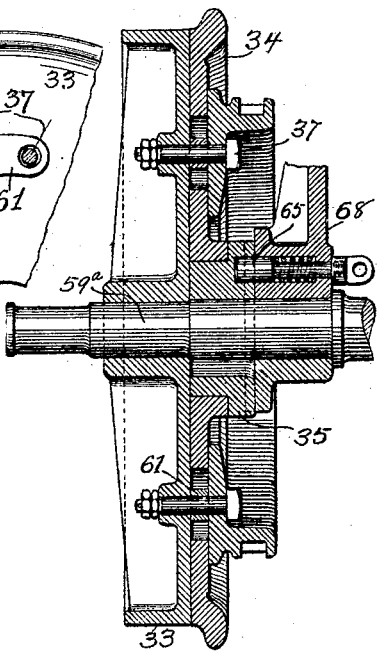
Figure 18 is a transverse section of a similar wheel to that of Figure 14 but mounted with a different bearing for the axle.
Figure 19:
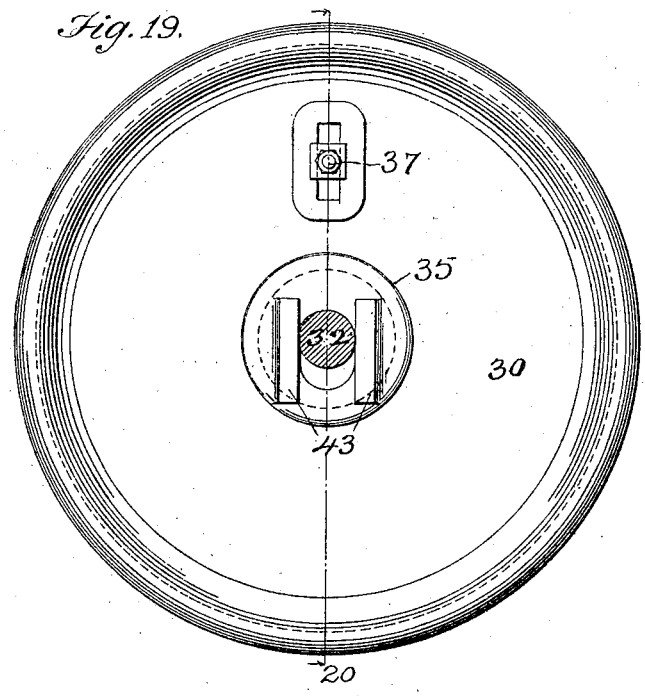
Figures 19 and 20 are respectively an inside elevation, and a transverse vertical section, of another modification of my improvement.
Figure 20:
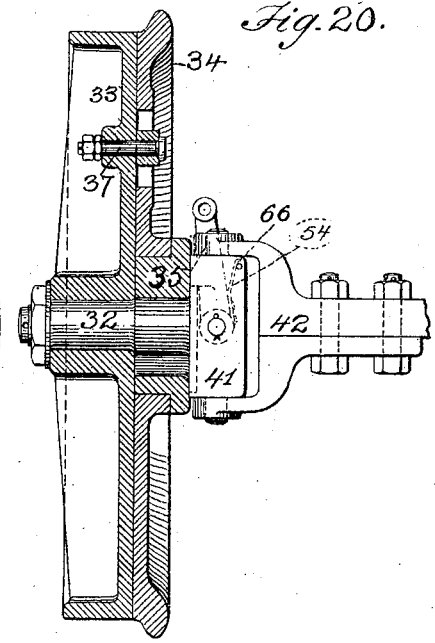
Figure 21:
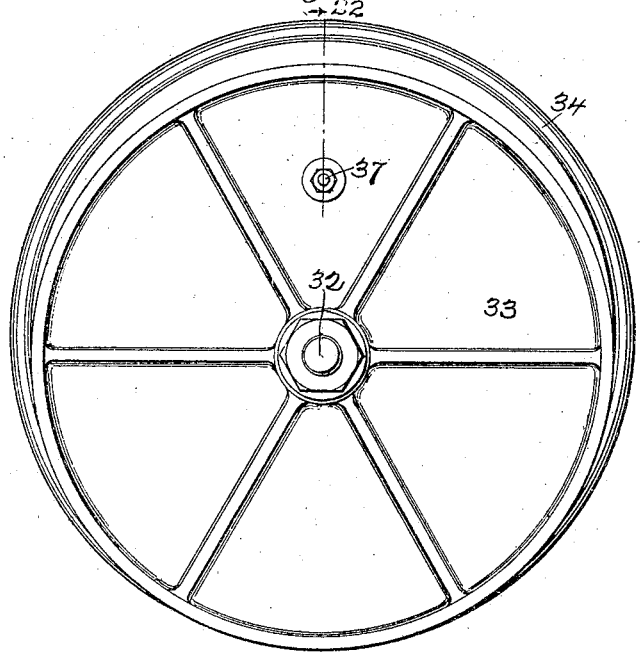
Figure 21 is an outside elevation of the wheel of Figure 19 with the flange raised out of operative position.
Figures 22, 23:
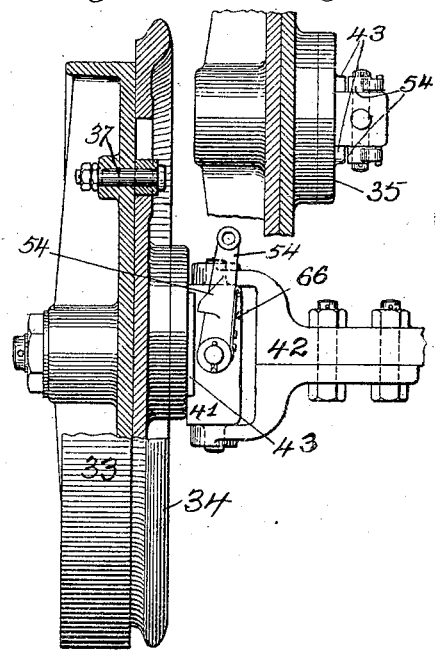
Figure 22 is a partial transverse section taken along the line (22) in Figure 1, showing the flange in elevated position and the fastening means withdrawn.
Figure 23 is a plan view showing some details of the locking device.

In the device shown on Sheet 1 of the drawings, the wheel 33 on the bearing 32, is provided with a separate flange-disk 34, mounted about a disk-center or sleeve 35, but the flange-disk 34 is provided with a number of openings 36 through which pass bolts 37, that, by means of the ring 38, tend to hold the flange-disk and wheel together, although not tightly, since binding is prevented by means of the bushings 39. The apertures 36 being made of larger internal diameter than the bushings 39, there is freedom of movement between the flange-disk and wheel to the extent of the difference in size between the bushing and the interior of the aperture, thus permitting of the raising and lowering of the flange disk to bring it into or retract it from operative position when desired, and its movement when the centers of rotation are eccentric.

The bearing knuckle or arbor 32 is pivoted by the head 41 to the vehicle axle 42 and the sleeve 35 has guide lugs 43 engaging the sides of head 41 to prevent its turning, but the sleeve has an elongated slot 40, so that it may shift vertically to throw the flange-disk out of operative position. When thrown down it is held in place by the block 44$^a$ on rod 44, shoved into the space 40 by the lever 45, which is pivoted at 46 to the knuckle head.

Referring now to Figures 7 to 12 inclusive, it will be seen that I have shown therein a modification of my improvement, in which the wheel 47 has a circular groove 50 through which project bolts 51, also working in slots 49 in the flange 48. They have bearing blocks 52, and the bolts may be covered by a guard 53. In this mechanism, as in the case of the mechanism shown in Figures 1 to 6, the flange-disk having radial slots 49, permits the raising and lowering movement necessary to effect the shifting of the flange-disk. The sleeve 35 is held in place in this case by spring-pressed hooks 54 engaging the lugs 43. The bolts 51 are inserted under the slotted hollow ridge 55 by removing the screw plug 56. This plug may have a stop 57 to prevent rotation of the bolts 51 in slot 50 when desired, and additional fixed blocks 58 may be provided for this purpose also.

Referring now more particularly to Figures 13 to 18 inclusive, it will be seen that I have therein shown still another modification of my improvement, in which the wheel is designed to be driven by means of a gear or sprocket wheel 60, which may serve also to act as a retaining ring for securing the flange-disk 34 to the wheel 33, the bolts 37 being arranged in pairs with elongated blocks 61, (Figure 17), so as to take the bending strain off the bolts, and prevent the driving force from operating to bind the flange-disk between the ring and the wheel. The blocks 61 are located in openings 36, which are of sufficient dimension and of proper shape to permit the requisite relative movement between the flange-disk and the wheel, whereby is secured the shifting of the flange-disk relative to the wheel, which serves to throw the flange disk into operative position, or to permit it to be retracted therefrom, or raised. In this device the axle 59 is shown as solid, resting in brackets 62 which has a slot 65 to engage the lugs 63 on the sleeve 35, for guidance vertically. The sleeve lug 63 has a hole 64 which is engaged by spring-pressed bolt 65 to hold it in position.

Referring now particularly to Figures 19 to 23, it will be seen that I have therein shown an arrangement of devices in which the flange-disk 34 is secured around sleeve 35 in the usual manner, adjacent to a wheel 33, but in which there is only a single bolt 37 connecting the flange-disk and wheel, this provision being for the purpose of causing the wheel and flange to be driven together, to get more tractive power, as might be desired in cases where the devices were used much on curved track. This arrangement, in other words, makes a simple means for securing driving connection between the flange-disk and wheel, while at the same time permitting the relative shifting movement between the two which is requisite to the purpose of my improvement. In this as in other figures where I have shown the wheel mounted upon an axle which is in connection with a steering knuckle, I have indicated a locking device 54, adapted to slip over the top of the projecting guides 43, when the sleeve on which the said guides are formed is in downward position, and hold the sleeve and flange-disk in such downward position, the engagement described being automatic by the action of the spring 66, while the disengagement is effected by means of suitable movement imparted to the lever 54.

It is obvious that as shown in all of the several figures, I have provided an improved wheel mechanism in which the wheel proper has a flange-disk which is of larger diameter than the wheel, and when in operative position forms a flange for the wheel concentric with the wheel, and operating in every respect substantially like the ordinary flanged wheel. While in this way producing a flanged wheel entirely satisfactory, I have at the same time, by the novel mechanism and devices shown, produced a flanged wheel which is capable of being made into a wheel without flanges, that is, into a wheel adapted to run on a smooth surface or roadway, by the elevation of the flange-disk, and in which the said elevation of the flange-disk can be made automatic if desired, as shown in Figures 24 to 26, wherein I have indicated an inclined device 67 adapted to strike an arm 68 when the vehicle at the end of the rail portion of its traverse passes on to the plane surface or roadbed 69, the stop device 67 thus automatically withdrawing the locking-block which I prefer to make of the style shown in Figures 1 to 6 inclusive, and the wheel then running upon the roadbed or plane surface after elevating the flange-disk and putting it out of action.

Figure 24:
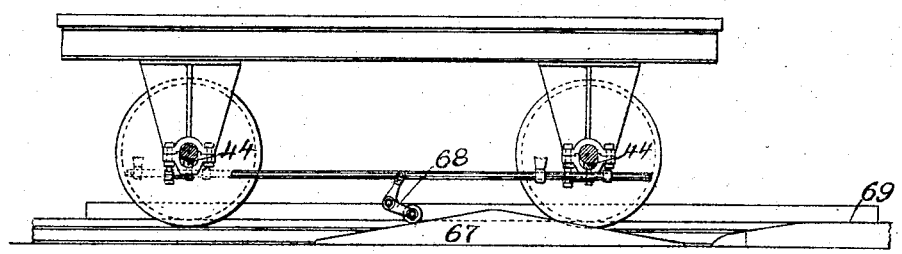
Figure 24 shows in side elevation, a mechanism for automatically disengaging the locking device when the car passes from a rail on to a plane surface, so as to permit the elevation of the flange.
Figure 25:
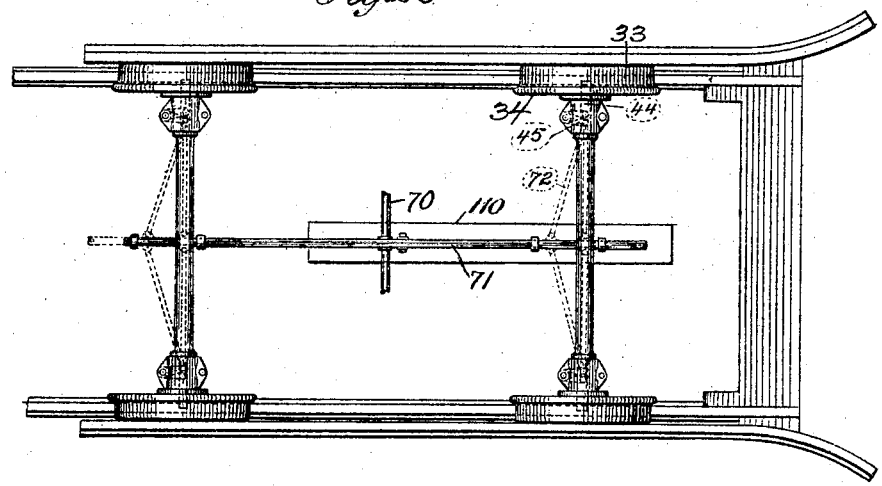
Figure 25 is a plan view, and Figure 26 an end elevation, of the same.
Figure 26:
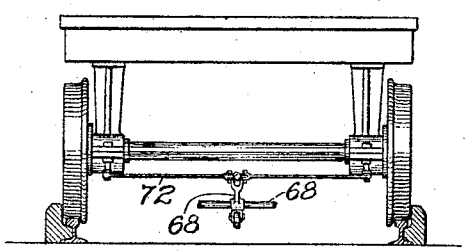

The means of connection shown in Figures 24 to 26 inclusive, between the lever 68 and the locking-lever 45, comprise essentially the transverse shaft 70, the longitudinal shaft or rod 71, and the toggle-links 72 which are secured to the inner ends of the locking-lever, the latter being in a measure guided in their movement by means of the pivoted levers.

Thus by the mechanism last above described the device is made automatic in passing from the rail to the floor, while it is, as already stated, entirely automatic in passing from the floor to the rail, because the relative frictional engagement between the flange-disk and the wheel will aid the force of gravity in bringing to its lower position the flange-disk, and in passing from the floor to the rail the flange-disk will work down until it comes into position where the locking-block or lever is pushed in by the spring to secure the disk in position in which the flange turns with the wheel. It will further be obvious from an examination of my improved mechanism, that when the flange-disks are in raised position, there will be a relative movement between them and the wheels, which will produce a kind of grinding action tending to eject any dirt which might become lodged between the surface of contact of the wheel and flange-disk. It is to be noticed that the automatic mechanism of Figures 24 to 26 will operate whether the truck is moving forward or backward.

As it may occur that intermediate of the two terminal stations of the railroad on which the car is running it would be desired to operate the locking bolt or block, and as it also may be desired at times, where there are intermediate inclines, such as the incline 67, and track continuations beyond the same, to put the automatic mechanism out of operation, or to prevent the incline from withdrawing the locking block, I have provided a mechanism for accomplishing this purpose, which is illustrated in Figures 27 to 32 inclusive, referring to which it will be seen that the shaft 70, which is actuated from the lever 68, is mounted at its end in suspension links 73 carried upon pivotal supports 74, secured by fixed attachment to some portion of the car or truck. At one end of the shaft 70 a hand lever 75 is provided, mounted about the shaft, and provided at 76 with a spring catch held by a trigger device adjacent to the handle, the said spring catch being constructed to engage the projection 78 on the links 73 (see Figure 29) when the spring-pressed bolt 79 is not drawn upward, so that when the lever is moved without withdrawing the spring bolt 79 the link 73 will move with the lever and the shaft 70 will be swung from the supporting points 74 in the center, which will serve to raise the parts as shown in Figure 27 in dotted lines, in which position the lever 68 will not come into contact with the incline 67, but will pass the same without withdrawing the locking-blocks from operative position. If it be desired at any time to withdraw the locking-blocks by hand by means of the lever 75, this can be accomplished by simply pressing on the lever 77, retracting the bolt 79 so that it will not engage the projection 78, when the lever 75 will rotate partially about the shaft 70, to an extent such as will be permitted by the slot 80 shown in Figure 31, after which the pin 81 will cause the shaft to turn with the lever about the center of the shaft and the lever will be raised as indicated by the dotted lines in Figure 28. The slot 80 (see Figures 31 and 32) is provided in order that when the mechanism is automatically actuated, the hand lever 75 will not be swung, while still there will be such relative engagement between the hand lever and shaft that the hand lever may be operated when desired to cause the rotation of the shaft.

The features of the pivoted knuckle, the snap hook device, and the wheel entirely rotatable when desired, as shown in Figures 7 to 12, I do not claim herein, but the same are covered in my co-pending application No. 198,350 filed as a division hereof.

But having thus described my invention and illustrated its use, what I claim herein, and desire to secure by Letters Patent, is the following:

1. A wheel comprising a plain tread portion on a non-rotatable axle, a vertically shiftable flange disk attached to the wheel, by means allowing the flange to move relatively to the wheel, combined with means on the axle engaging said disk for shifting the flange into and out of operative position.

2. A shiftable flange for a car wheel directly attached thereto and so mounted upon said wheel that it may be thrown into and out of operative position as an active flange, and a non-rotating bearing for said flange having means to shift and fix it in place.

3. The combination with an axle and a wheel thereon, of a supplemental shiftable hub, a flange disk mounted upon said hub and attached to the wheel itself by means allowing motion relatively to the wheel, automatic means for shifting the hub to throw the flange into operative position, and locking means for holding said eccentric hub.

4. The combination with a wheel of a gear wheel attached thereto by pins and a shiftable flange working between said gear and said wheel, substantially as described.

5. The combination with a wheel, of a gear wheel attached thereto, a shiftable flange for said wheel mounted between the gear and the wheel and mounted upon a shiftable hub surrounding the axle of the wheel, means for shifting the hub vertically, and means for preventing the said hub from rotating.

6. The combination with a wheel having a shiftable flange thereon and means for operating the same, a connection to said operating means provided with tripping devices, in combination with an actuating flange or abutment upon the wheel rail whereby contact of said tripping device with said abutment will operate the mechanism to throw the flange into working position.

7. The combination with a wheel provided with shiftable flange mounted on a movable hub, levers attached to said hub for shifting the same, and devices attached to said levers and co-operating with the guide abutment upon the wheel rail or track whereby said levers are operated when the wheels run over said abutment.

8. The combination with a wheel with shiftable flange, adapted to run either upon a plane surface or upon a grooved track, of a track for said wheel, an abutment adjacent to said track, and means carried upon the wheel whereby tripping mechanism is operated by said abutment to throw the flange into and out of operative position as it approaches the said track.

9. The combination with a wheel of a shiftable flange attached thereto and mounted upon a movable hub, means for preventing the rotation of said hub but allowing its vertical shifting, and means for automatically locking the said hub in raised position when it is pushed up by contact of the flange of the wheel on the floor.

10. The combination with a wheel having a shiftable flange mounted upon a movable hub, of means for shifting said hub and a snap hook for holding the said hub in raised position.

11. In a vehicle wheel the combination of a wheel proper having a series of stud bolts, a ring provided with a gear mounted upon said bolts and spaced from the wheel by blocks, and a vertically shiftable flange disk mounted upon the wheel axle between the wheel and the gear ring and provided with enlarged openings loosely engaging said spacing blocks and bolts.

12. The combination with an axle having a pivoted bearing knuckle, of a wheel having attached thereto a movable flange disk, a vertically shiftable but non-rotative sleeve surrounding the axle and supporting the disk, and means borne on the knuckle for locking the sleeve in operative position.

13. The combination with a fixed axle having a pivoted bearing knuckle, of a wheel on the knuckle and a flange disk for the wheel attached to the wheel by means allowing relative movement, and a bearing sleeve supporting the disk vertically shiftable but non-rotative upon the knuckle, substantially as described.

In testimony whereof I have hereunto set my hand in the presence of two subscribing witnesses.

HENRY H. PORTER, Jr.

In presence of—
  PAUL SYNNESTVEDT,
  PAUL CARPENTER.